C. J. TROPPMAN.
AVIATOR'S GOGGLES.
APPLICATION FILED APR. 20, 1918.
1,295,391.
Patented Feb. 25, 1919.
2 SHEETS—SHEET 2.
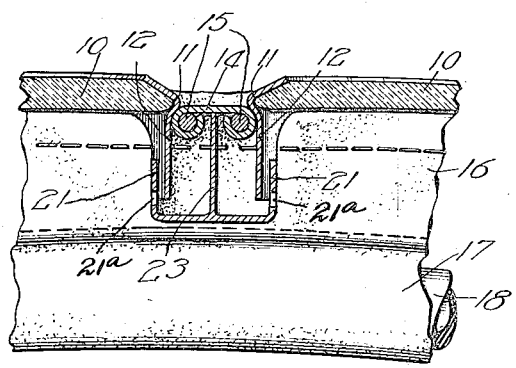
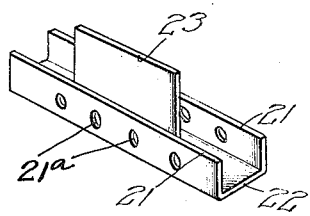
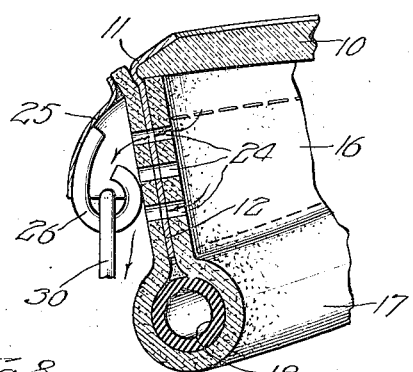
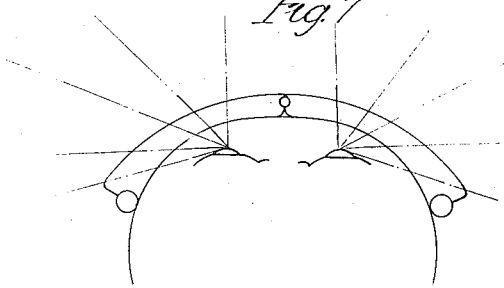
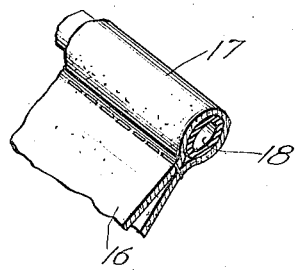
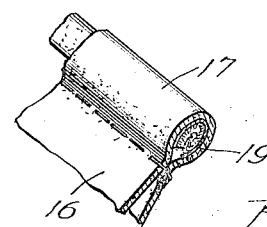
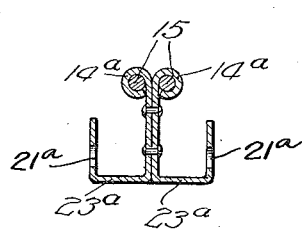
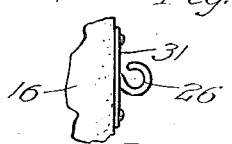
Inventor
Charles J. Troppman

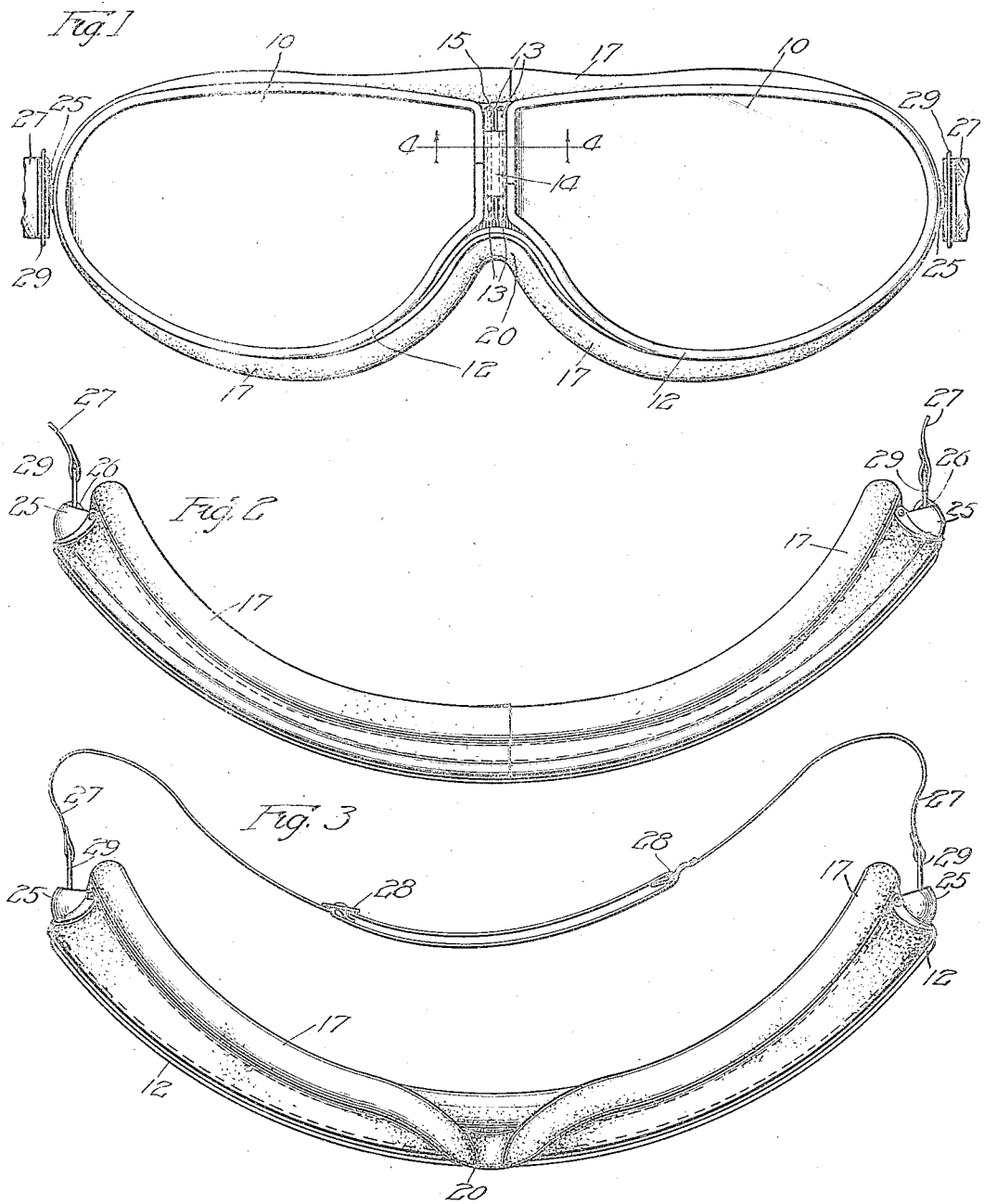

UNITED STATES PATENT OFFICE.

CHARLES J. TROPPMAN, OF CHICAGO, ILLINOIS, ASSIGNOR TO F. A. HARDY & COMPANY, OF CHICAGO, ILLINOIS, A CORPORATION OF ILLINOIS.

AVIATOR'S GOGGLES.

1,295,391.  Specification of Letters Patent.  Patented Feb. 25, 1919.

Application filed April 20, 1918. Serial No. 229,739.

*To all whom it may concern:*

Be it known that I, CHARLES J. TROPPMAN, a citizen of the United States, and a resident of the city of Chicago, county of Cook, and State of Illinois, have invented certain new and useful Improvements in Aviators' Goggles, of which the following is a specification.

My present invention has relation to goggles or eye protectors for use by persons engaged in aviation and like pursuits, motor vehicle drivers and other persons who shall find it desirable to employ protectors for the eyes, especially when driving or traveling against the wind. My invention has further relation to certain improvements in the structure illustrated and described in my prior Letters Patent of the United States No. 1,254,090, issued January 22, 1918, for aviators' goggles.

In my said prior Letters Patent above referred to, I have disclosed a goggle or eye protector that is capable of being folded into a compact form whereby it will occupy a minimum amount of space in the pockets or apparel of the user when not in use. In the designing of my said prior goggle for compactness, the range of vision through the lenses was somewhat reduced, owing to the employment of flat or plain lenses, and a portion of the side or lateral vision was sacrificed so that it was necessary for the wearer to turn his head in order to glance at or view objects at his sides or flanks. It is therefore an object of my present invention to eliminate these inherent objections by providing a goggle that is especially adapted for persons engaged in hazardous pursuits, such as aviation, and the like, whereby the range of vision through the lenses is increased to such full vision as will give the wearer substantially the same range of vision as he would be capable of when the goggle is removed. At the same time, it is an object of my invention to provide a goggle wherein the lenses may be so shaped that the curvature thereof will fit snugly to the contour and shape of the head of the average person, so that when the goggle is in position, each of the eye sockets will be completely protected from the strong blasts of air or wind and the range of vision of the person wearing the goggle will not be decreased thereby.

Further objects of my invention are the provision of suitable ventilating means whereby a circulation of air throughout the eye cups may be obtained without permitting a draft of air to strike directly upon the eyes of the wearer. Another object of my invention consists in providing a suitable cushion upon the portions of the eye cups that fit the face of the wearer, so that the goggles may be worn with comfort. A still further object of my invention consists in utilizing a portion of the before-mentioned cushion, by bending or folding it back upon itself, to provide a suitable nose piece or rest, that will snugly and comfortably fit the nose of the wearer. Other objects will be obvious to others skilled in this art after an understanding of my invention is had from the following description:

I prefer to accomplish the divers objects of my invention by substantially the means and manner hereinafter fully described and as more particularly pointed out in the appended claims, reference now being had to the accompanying drawings for a better understanding of my invention, it being understood that the drawings are merely diagrammatical of one form in which the goggles may be fabricated.

Figure 1 is a front elevation of a pair of aviator's or like goggles, made in accordance with a preferred form of my invention.

Fig. 2 is a top plan thereof.

Fig. 3 is a bottom plan thereof.

Fig. 4 is an enlarged fragmentary section showing in detail the ventilating means at the nose piece or hinge, the section being taken on line 4—4 of Fig. 1.

Fig. 5 is a detail perspective view of the ventilating baffle removed from the goggle.

Fig. 6 is a detail view of the outlet of the ventilating device.

Fig. 7 is a diagrammatical plan illustrating the range of vision capable with my improved goggle.

Fig. 8 is a perspective sectional view of the preferred form of cushioning strip, drawn to an enlarged scale.

Fig. 9 is a similar sectional view of a modified form of the cushioning strip.

Fig. 10 is a sectional view of a modified form of ventilating baffle.

Fig. 11 is a fragmental detail of a modified manner of attaching the head band.

Referring to the drawings, wherein similar reference characters are employed to designate the same parts throughout the views, it will be seen that my goggle preferably comprises a pair of lenses 10, of the "leaf" or "lobe" type, the edges whereof are disposed in suitable concave recesses 11 made in the outer portions or edges of a pair of metallic or like eye cups 12. The eye cups are formed from a substantially flat strip of metal and bent to conform to the contours of the edges of the lenses and for the purpose of hinging or joining the cups, their adjacent edges are made straight and parallel with each other and are each provided with alining knuckles 13. A suitably shaped connecting hinge link 14, having parallel knuckles, is positioned between the upper and lower pairs of knuckles 13, and pintles 15 are inserted through the upper and lower knuckles, and through this link 14 so as to hingedly connect the respective cups and lenses.

The structure so far described is substantially the same as that disclosed in my above mentioned Letters Patent No. 1,254,090, excepting that the major axes of the lenses, and consequently the horizontal dimension or length of the cups, is considerably increased so that the outer edges of the lenses will be positioned at points back of the outer corners of the eye sockets of the person wearing the goggle. It will also be observed, by reference to Fig. 2 of the drawings and the diagram (Fig. 7), that the curvature of the outer upper edges of the pair of lenses and cups is substantially a true arc of a circle struck from a single radius. This will permit the wearer to glance to either side without turning his head, as his range of vision will not be decreased by the cups or lenses, but he will be capable of employing his full and unobstructed vision at all times, as is demonstrated in the diagram in Fig. 7, while at the same time the lenses will always be interposed at a less oblique angle to the line of vision than if they were not so curved, and, the error, which, as is well-known, would otherwise be created by an oblique interposition of the lenses, will be largely eliminated.

In order to have the cups fit snugly to the contour of the wearer's face, the rear or inner edges of said cups are cut irregularly, as shown, the upper portions of the cups that fit against the forehead being substantially parallel with the front edges thereof, while the sides of said upper portions become wider toward the horizontal plane of the major axes of the lenses in order to conform to the person's temples.

I have provided the inner edges of the cups with a protecting pad that preferably consists of a relatively long narrow strip of leather, kid or like fabric, 16, that is folded upon itself longitudinally and stitched to provide a tubular pocket 17 adapted to inclose a gum rubber tube 18, as shown in Fig. 8, or a strip of wool 19, that is rolled with the hairs inside, as illustrated in Fig. 9. The cushion is secured to the inner edges of the eye cups, preferably by sewing or lacing through suitable apertures made adjacent the inner edges of the cups. It will be noted that a single or continuous cushion is employed for both cups by first attaching one end of the cushion to one of the cups adjacent the upper end of the hinge, and then continuing to attach it to the respective cups by bridging the lower portion adjacent the bottom of the hinge, so that the other end of the cushion will terminate at the upper end of the hinge and abut the first end of the cushion. This permits me to roll the tubular portion 17 back upon itself and securely attach it to the material adjacent the bottom of the hinge, thereby providing a novel, dependable, and comfortable nose piece or bridge 20, as illustrated in Figs. 1 and 3 of the drawings.

It will be found that goggles constructed in this manner will fit so snugly to the wearer's face that, under ordinary conditions the inside surfaces of the lenses will "sweat", and also that such air as finds ingress to the cups will be strong, sharp currents that will enter around or between the joints of the hinge, thereby causing considerable discomfort to the wearer, which will be extremely dangerous to an aviator. In order to break up or distribute the air currents that reach the inside of the goggle, and also to provide a complete ventilation thereof, I have devised a suitable U-shaped baffle (Fig. 5) the parallel arms 21 whereof are disposed alongside the vertical portions of the cups adjacent the hinge and a slight distance from the inside surfaces of the lenses, while the connecting member 22 passes inside or behind the hinge and connected parts. A vertical lateral fin 23 projects from the central portion of the member 22, and its outer edge is secured between the knuckles of the hinge link 14. The arms 21 of the baffle may be perforated, as at 21$^a$, in order to increase the circulation of air.

A modified baffle combined with hinge link knuckles is illustrated in Fig. 10 of the drawings, which consists of two L-shaped pieces of metal 23$^a$, secured together, back to back, each having a knuckle 14$^a$ upon the edge of the longer member, which knuckles, when the members are secured together, as shown in Fig. 10, form the hinging link for connecting the eye cups and the lenses carried thereby. The arms of this modified baffle are then disposed in the same manner as in the preferred form heretofore described.

The air admitted to the interior of the cups through the hinge and distributed therethrough by means of the baffle just described is permitted to escape through eyelets or apertures 24 provided in the side walls of the cups and preferably under the rearwardly opening shields 25, also secured by rivets or in any other desired manner to the outer edges of the eye cups. Extending from the interior surfaces of the shields 25, are hooks 26 to which may be conveniently attached the head band for holding the goggles in proper position upon the head of the wearer. This head band is of ordinary construction and preferably comprises two pieces of elastic fabric or bands 27, that are adjustably secured together by the runners or buckles 28. The outer ends of the bands 27 are provided with the metallic loops 29, which are formed with eyes 30 adapted to assemble with the hooks 26.

The head band 27 may be, if desired, secured to the fabric of the cushion back of and independently of the shields, by means of brackets such as 31, as shown in Fig. 11. In this latter case, the fabric will be pulled rearwardly into close contact with the face of the wearer and in such manner as to be extended adjacent its place of contact, whereas when the head band is secured to the cups through the shields, the fabric is compressed between the cups and the face of the wearer at the point of contact. This latter arrangement is not quite so conducive to a smooth and comfortable fit, but, nevertheless, can be so adjusted and for particular forms of forehead and temple, may no doubt be preferable.

What I claim is:

1. A goggle comprising eye-cups, lenses mounted therein, and a continuous cushion surrounding and extending between the inner edges of said eye-cups and the portion of said cushion between said eye-cups being folded back and secured upon itself to provide a nose piece.

2. A goggle comprising eye-cups, a hinge connecting the adjacent edges of the same, a baffle disposed back of said hinge, means for securing substantially complete contact between the rear edges of said eye-cups and the head of the wearer, and rearwardly extending shields carried by the outer edges of said eye-cups which said eye-cups are provided with draft outlet ports opening into said shields.

3. A goggle comprising eye-cups constructed to provide substantially complete contact with the head of the wearer, a hinge connecting the adjacent edges of said eye-cups, a baffle disposed back of said hinge, and means providing a rearward egress of the air admitted around said baffle.

4. A goggle comprising eye-cups, a hinge connecting the adjacent edges of the same, a substantially U-shaped baffle opening toward and disposed back of said hinge, means for securing substantially complete contact between the rear edges of said eye-cups and the head of the wearer, and rearwardly extending shields carried by the outer edges of said eye-cups which said eye-cups are provided with draft outlet ports opening into said shields.

5. A goggle comprising eye-cups constructed to provide substantially complete contact with the head of the wearer, a hinge connecting the adjacent edges of said cups, a substantially U-shaped baffle opening toward and disposed back of said hinge, and means providing a rearward egress of the air admitted around said baffle.

6. A goggle comprising eye-cups constructed to provide substantially complete contact with the head of the wearer, a hinge connecting the adjacent edges of said cups, a baffle consisting of plates of L-section arranged back to back and extending rearwardly from said hinge, and means providing a rearward egress of the air admitted around said baffle.

7. A goggle comprising eye-cups constructed to provide substantially complete contact with the head of the wearer, a hinge connecting the adjacent edges of said cups, a baffle of substantially U-section, a fin extending centrally thereof and connecting with said hinge, and means providing a rearward egress of the air admitted around said baffle.

8. A goggle comprising eye-cups having their inner edges provided with a continuous cushion to provide substantially complete contact with the head of the wearer, a hinge connecting the adjacent edges of said cups, a baffle disposed back of said hinge, and means providing a rearward egress of the air admitted around said baffle.

Signed at Chicago, county of Cook, and State of Illinois, this 8th day of April, 1918.

CHARLES J. TROPPMAN.

Witnesses:
EDWARD S. CRAVEN,
BENJ. T. ROODHOUSE.